United States Patent

Holmes

[11] Patent Number: 5,864,860
[45] Date of Patent: Jan. 26, 1999

[54] COMPRESSION OF STRUCTURED DATA

[75] Inventor: Keith Holmes, Waterloo, Belgium

[73] Assignee: International Business Machines Corporation, Armonk, N.Y.

[21] Appl. No.: 723,073

[22] Filed: Sep. 30, 1996

[30] Foreign Application Priority Data

Feb. 8, 1996 [GB] United Kingdom .................. 9602550

[51] Int. Cl.⁶ .................................................. G06F 17/30
[52] U.S. Cl. ........................ 707/101; 707/100; 395/888; 341/51
[58] Field of Search ............................. 341/51; 395/888; 707/100, 101

[56] References Cited

U.S. PATENT DOCUMENTS

| 5,179,378 | 1/1993 | Ranganathan et al. | 341/51 |
| 5,298,895 | 3/1994 | Van Maren | 341/51 |
| 5,325,091 | 6/1994 | Kaplan et al. | 341/51 |
| 5,389,922 | 2/1995 | Seroussi et al. | 341/51 |
| 5,455,576 | 10/1995 | Clark, II et al. | 341/50 |
| 5,525,982 | 6/1996 | Cheng et al. | 341/51 |
| 5,553,283 | 9/1996 | Kaplan et al. | 707/101 |
| 5,561,421 | 10/1996 | Smith et al. | 341/51 |
| 5,585,793 | 12/1996 | Antoshenkov et al. | 341/51 |
| 5,754,847 | 5/1998 | Kaplan et al. | 707/100 |
| 5,778,255 | 7/1998 | Clark et al. | 395/888 |

FOREIGN PATENT DOCUMENTS 63-296147  2/1988  Japan .............................. G06F 12/00

OTHER PUBLICATIONS

D.Richards, "Data Compression and Gray–Code Sorting", Information Processing Letters 22 (1986) 201—201, North-Holland, Apr. 17, 1986.
Processing of Compressed Data Filed, IBM Technical Disclosure Bulletin, May 1974, pp. 1–3, (3958–3959).

Primary Examiner—Paul R. Lintz
Assistant Examiner—Charles L. Rones
Attorney, Agent, or Firm—Douglas W. Cameron

[57] ABSTRACT

A system and method for compressing a data sequence having a plurality of records, where each record has a plurality of fields with each field being arranged to contain a data item. The system compares a data item in a current field of a current record with a data item of a corresponding field of a preceding record. If there is a match, the current data item is replaced by a token indicating the match.

11 Claims, 2 Drawing Sheets

COMPRESSION OF STRUCTURED DATA

FIELD OF THE INVENTION

The present invention relates to the compression of structured data, in particular data sequences comprising a plurality of records, each record having a plurality of fields and each field being arranged to contain a data item.

BACKGROUND INFORMATION

Such data sequences are used widely in computer processing fields, as many computer applications involve the creation and manipulation of structured data. For instance, such data sequences are used extensively in database systems. Generally in such systems, there will be a database server computer arranged to manage the data within the database. Client computers will connect to the server computer via a network in order to send database queries to the server computer. The server will then process those queries, and pass the results back to the client. These results will generally take the form of a structured data sequence of the type discussed above (ie having a plurality of records, and each record having a plurality of fields with data items stored therein). For example, a database containing details of a company's employees would typically have a data record for each employee. Each such data record would have a number of fields for storing data such as name, age, sex, job description, etc. Within each field, there will be stored a data item specific to the individual, for example, Mr Smith, 37, Male, Sales executive, etc. Hence a query performed on that database will generally result in a data sequence being returned to the client which contains a number of records, one for each employee meeting the requirements of the database query.

Since data storage is expensive, it is clearly desirable to minimise the amount of storage required to store structured data. Additionally, when a data sequence is copied or transferred between storage locations, it is desirable to minimise the overhead in terms of CPU cycles, network usage, etc. within the database field, much research has been carried out in to techniques for maintaining copies of data. Generally, these techniques are referred to as 'data replication' techniques. The act of making a copy of data may result in a large sequence of data being transferred from a source to a target, which as mentioned earlier is typically very costly in terms of CPU cycles, network usage, etc. within the database arena, this 'data replication' is often a repeated process with the copies being made at frequent intervals. Hence, the overhead involved in making each copy is an important issue, and it is clearly advantageous to minimise such overhead.

To reduce the volume of data needing to be transferred and the time required to copy a set of data, an area of database technology called 'change propagation' has been developed. Change propagation involves identifying the changes to one copy of a set of data, and to only forward those changes to the locations where other copies of that data set are stored. For example, if on Monday system B establishes a complete copy of a particular data set stored on system A, then on Tuesday it will only be necessary to send system B a copy of the changes made to the original data set stored on system A since the time on Monday that the copy was made. By such an approach, a copy can be maintained without the need for a full refresh of the entire data set. However, even when employing change propagation techniques, the set of changes from one copy to the other may be quite large, and hence the cost may still be significant.

Given the above problems, it is an object of the present invention to provide a technique for compressing structured data which will alleviate the cost of maintaining and replicating structured data.

SUMMARY OF THE INVENTION

Accordingly the present invention provides a method of compressing a data sequence comprising a plurality of records, each record having a plurality of fields and each field being arranged to contain a data item, the method comprising the steps of: (a) for a current field within a current record other than the first record in the data sequence: (i) comparing the data item in the current field with the data item in the corresponding field of a preceding record; (ii) if the data item matches the data item in the corresponding field, replacing the current field data item by a token indicating the match; and (b) repeating step (a) for a predetermined number of fields in a plurality of records of the data sequence.

In preferred embodiments, the comparison step (a) is repeated for the predetermined number of fields in every record of the data sequence. However, there may be instances where it is desired to only perform the comparison on a subset of the records of the data sequence, and the invention is clearly applicable to such situations. Additionally, the comparison step (a) is preferably performed for every field in the current record. However, in some situations, it may be more efficient to apply some filtering such that some of the fields are not subjected to the comparison process. This may for example be the case for fields which contain only a few characters, because in such cases, the compression achievable may not warrant the time spent performing the compression process.

In preferred embodiments, at step (a) (i), the data item in the current field is compared with the data item in the corresponding field of the immediately preceding record, and the method further comprises, subsequent to performing the comparison step (a) for the predetermined number of fields in the current record, the step of storing the uncompressed current record as the immediately preceding record for use in the performance of said step (a) (i) on the predetermined number of fields of a subsequent record. This provides an efficient technique for performing the comparison step, and avoids the need for the comparison means to retain information about more than one preceding data record.

Further, in preferred embodiments, steps (a) and (b) are performed by a processor of a server computer, the method comprising the further step of sending the data records of the data sequence as compressed by steps (a) and (b) over a network to a client computer.

The token used in step (a) (ii) may take any appropriate form. However, to maximise compression, it is preferable for the token to take the form of a predetermined single character, and in preferred embodiments, the token is the '.' character. However, the token may be any appropriate character(s) which is/are recognisable as the token.

The present invention further provides a method of decompressing a data sequence compressed according to the above described method, comprising the steps of: (A) for each field within a current record other than the first record in the data sequence: determining whether the field contains the token; if the field does contain the token, replacing the token by the data item in the corresponding field of a preceding record; and (B) repeating step (A) for a plurality of records of the data sequence.

Viewed from a second aspect, the present invention provides a system for compressing a data sequence comprising a plurality of records, each record having a plurality of fields and each field being arranged to contain a data item, the system comprising: comparison means which, for a current field within a current record other than the first record in the data sequence, is arranged to compare the data item in the current field with the data item in the corresponding field of a preceding record; and match indication means, responsive to a signal from the comparison means indicating that the data item matches the data item in the corresponding field, for replacing the current field data item by a token indicating the match; the comparison means being arranged to repetitively perform the comparison process on a predetermined number of fields in a plurality of records of the data sequence.

BRIEF DESCRIPTION OF THE DRAWINGS

The present invention will be described further, by way of example only, with reference to a preferred embodiment thereof as illustrated in the accompanying drawings, in which.

DESCRIPTION OF THE PREFERRED EMBODIMENT

The preferred embodiment of the present invention will be described with reference to a database server arranged to process database queries from client computers connectable to the server over a computer network. However, it will be apparent that the present invention is applicable to any situation where it is desirable to represent a structured data sequence in a compressed form, for example where storage space is limited or expensive.

In the preferred embodiment, we will consider the issue of transferring the results of a database query represented as a data sequence using a text delimited system. The data sequence will contain a plurality of data records, each data record representing one database entry and being referred to herein as a 'row' of data. Each row of data contains a set of fields delimited from each other by some character (usually a comma) in a text format. This format is often known as ASCII delimited in the personal computer arena. In such representations, number fields are often prefixed by a +/− sign, strings are surrounded by quotes, and sometimes insignificant digits (trailing blanks, leading zeroes) are dropped, for example:

"Smith", "John",+26, "Vice-President", "Lamborghini Countach" "Jones", "Alexander",+47, "Junior Under-Secretary", "Ford Escort"

(where the fields represent surname, first name, age, job description, and car, respectively)

However, the exact representation of the 'rows' or data records is not relevant for the purposes of the present invention; all that is required is that the compression system is able to identify the individual fields in the 'row'.

Figure 1:
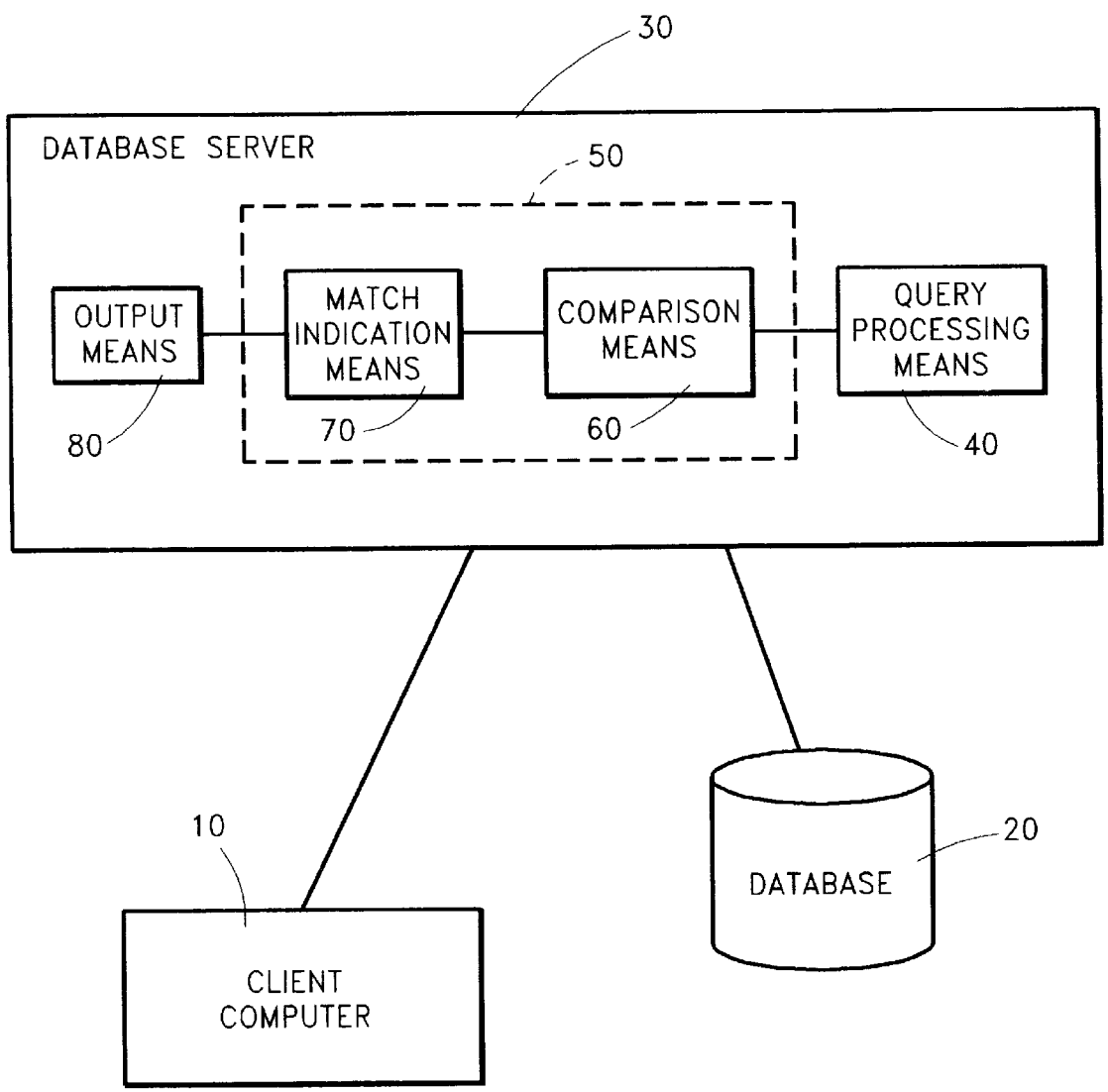
FIG. 1 is a block diagram of a database server in accordance with a preferred embodiment of the present invention.
Figure 2:
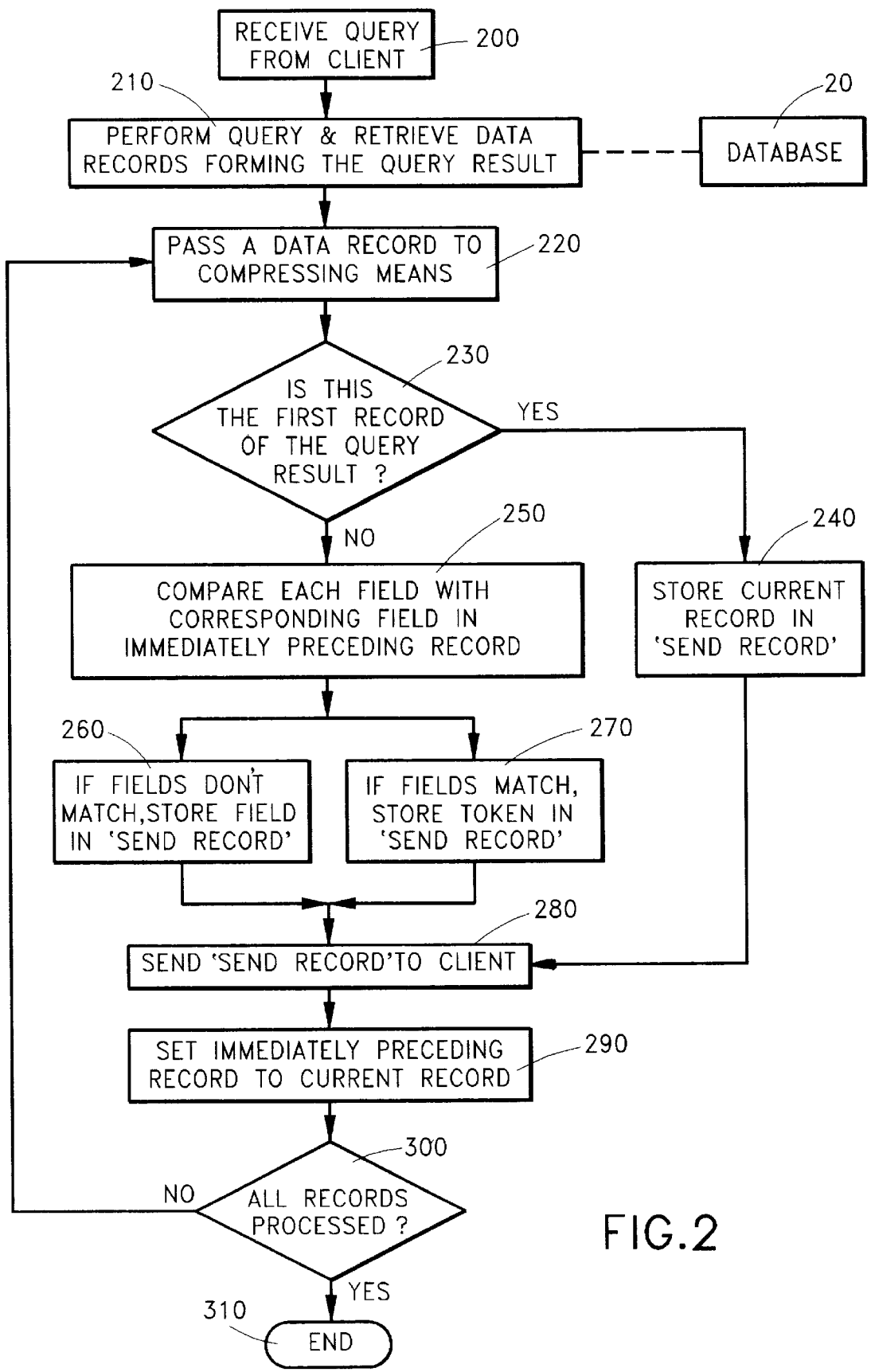
FIG. 2 is a flow diagram illustrating the processing steps involved in compressing a data sequence in accordance with the preferred embodiment of the present invention.

The system of the preferred embodiment will now be described in more detail with reference to FIGS. 1 and 2. When a user of a client computer 10 wishes to retrieve data from the database 20, he/she will construct a database query defining the information required from the database, and will send that database query to the database server 30. As will be appreciated by those skilled in the art, the database server 30 will typically be provided on a network, and will hence be able to receive requests from any client computers capable of accessing the database server 30 over that network.

Once the database server 30 has received the database query at step 200, it will employ a query processing means 40 to process the database query. At step 210, the query processing means will access the database 20 and retrieve the data records matching the criteria set out in the database query issued by the client computer 10. As each row (ie data record) is retrieved, that row is passed at step 220 through the compressing means 50. Alternatively, the server 30 may wait until all rows forming the query result have been retrieved, and then pass the rows through the compressing means 50. The former approach is favoured in preferred embodiments since it enables the server to begin outputting compressed data to the client 10 as soon as possible, possibly even before all the rows of the query result have been retrieved by the query processing means 40.

Due to the structured nature of the data records retrieved from the database, the compressing means is able to identify the individual fields within each data record. For instance, in the preferred embodiment, the individual fields are separated by a comma, and the compression means is arranged to identify the comma character and hence the end of each field.

At step 230, it is determined whether the current record passed to the compressing means 50 is the first record of the query result. If it is, then in preferred embodiments, this first record is passed through the compression means 50 unchanged. Hence, at step 240, the first record is stored as the 'send record', the send record being the record which will be returned to the client 10.

Each subsequent record is passed one-by-one through the comparison means 60 of the compression means 50. Hence, if at step 230 it is determined that the current record is not the first record, the comparison means 60 is arranged such that, for each field in a current record, the comparison means compares the contents of that field with the contents of the corresponding field in the immediately preceding data record (step 250). If the contents do not match, then at step 260 the contents of the field are stored in a 'send record' representing the compressed form of the current record. However, if the contents do match, then at step 270 the field of the current record is passed through the match indication means 70, where the data for that field is replaced by a 'token' in the send record, this token indicating that the content of that field is the same as the content in the corresponding field of the immediately preceding record. In preferred embodiments, the token is chosen to be a single character such as a '.', since the use of a single character enables a good compression to be achieved.

After all fields of the current record have been passed through the compressing means 50, the send record representing the compressed form of the current record is passed to the output means 80 for transmission to the client 10 at step 280. The output means 80 may pass the send records one by one back to the client, or may wait until all data records in the query result have been processed by the compressing means 50, and then send all of the send records as a single file to the client 10.

Once the send record for a current record has been passed to the output means 80, then at step 290 the uncompressed current record is stored as the 'immediately preceding record' for use by the comparison means 60 in the comparison step 250 performed on the next data record.

Then, at step 300, it is determined whether all the records forming the query result have been processed, and if they have the compression process ends (step 310). Otherwise, the process returns to step 220, where the next record is passed to the compressing means 50.

Once the client computer 10 has received the send records sent by the database server 30, these send records can be readily decompressed by the client computer. The first record will not be compressed, and so needs no processing by the client 10. The client would then review the second record for the presence of the token in any of the fields, and for any fields having the token, the client would replace the token by the data item in the corresponding field of the first record. Once this process had been completed for the second record, the client would keep a record of the decompressed second record, and then review the third record. Again, any tokens identified would be replaced by the data item in the corresponding field of the second record. Next, a record of the decompressed third record would be kept, and the process would be repeated for the fourth record, etc.

As an example, consider the following records received by the client 10 as the first three records of the query result:

| Record 1: | XXX, YYY, ZZZ |
| Record 2: | AAA, . . . , BBB |
| Record 3: | . . . , . . . , CCC |

Record 1 would be stored 'as is' by the client. Upon reviewing record 2, the token '.' would be identified and replaced by the data item YYY to yield a decompressed second row of "AAA,YYY,BBB". This decompressed form would be stored, and then the third record would be reviewed. Again, the two tokens would be identified and replaced by the data items in the corresponding fields of the previous (ie second) record, yielding a decompressed third record of "AAA,YYY,CCC". this process would be repeated for all the send records in the query result.

As will be apparent from the above description, the technique of the preferred embodiment involves removing repeated fields and replacing them with a small representative token. It is based on an understanding of the fact that the data is held in fields which are capable of being repeated, as opposed to treating the data sequence as one stream of bytes.

This technique is best explained by a simple example. In this example, we will consider the situation of a database query issued at a client machine resulting in a server machine returning an answer set for a report. Some form of communications is assumed on a row-by-row basis, but the answer set could equally be returned as a data file, etc. The answer set may well have come from a 'join across multiple tables' process, but this is irrelevant for the purposes of the present invention. The answer set used in this example is typical of those returned from a Data Warehouse or Management information System (MIS) application, and typical of a replication environment maintaining such a system.

Many fields in a database query/report are from a limited set of values. Examples such as 'Job_Type' may only have certain values in a company e.g. Manager, Clerk, etc., Department, State, etc.

As an example, if a marketing report was trying to determine the types of goods sold in all retail stores across the United States for a particular period, and to see if there was any geographical significance, the following query may be issued:

SELECT GOODS, VALUE, STORE, STATE from where.ever

This may result in data of the following form being returned to the client:

| GOODS (50 Chars) | INCOME (10) | STORE (100 Chars) | STATE (40 Chars) |
|---|---|---|---|
| "Hardware", | 100000, | "Unit 12, Raleigh Mall, Cary", | "North Carolina" |
| "Software", | 90000, | "Unit 12, Raleigh Mall, Cary", | "North Carolina" |
| "Peripherals", | 132000, | "Unit 12, Raleigh Mall, Cary", | "North Carolina" |
| "Supplies", | 64000, | "Unit 12, Raleigh Mall, Cary", | "North Carolina" |
| "Magazines", | 295000, | "Unit 12, Raleigh Mall, Cary", | "North Carolina" |
| "Hardware", | 12000, | "Pebble Mill Mall, Raleigh", | "North Carolina" |
| "Software", | 74000, | "Pebble Mill Mall, Raleigh", | "North Carolina" |
| "Peripherals" | 108000, | "Pebble Mill Mall, Raleigh", | "North Carolina" |
| "Supplies", | 77000, | "Pebble Mill Mall, Raleigh", | "North Carolina" |
| "Magazines", | 125000, | "Pebble Mill Mall, Raleigh", | "North Carolina" |
| . . . | | | |
| etc | | | |

Assuming there are:
a) Unique randomly distributed values for INCOME;
b) 5 classifications of GOODs: (Hardware/Software/Peripherals/Supplies/Magazines); and
c) 40 STOREs in each of fifty STATEs (2000 Stores in total)

this query would return 10,000 rows. (ie. '5×40×50'). Given this number of rows, the returned data size would be equal to two million characters (ie (50+10+100+40) * 10,000).

Using the technique of the preferred embodiment of the present invention, the higher the rate of repetition, the better the effect of the compression will be. Therefore data that is ordered by fields that are likely to repeat will gain the most benefit.

If ordered by STATE, STORE, GOODS, then each state would only be sent once in its full form, and each store would be sent once per state in its full form. Hence, for the above illustrated example, the data sequence would be reduced to the following form (where a '.' symbol is used as the token):

| | | | |
|---|---|---|---|
| "Hardware", | 100000, | "Unit 12, Raleigh Mall, Cary", | "North Carolina" |
| "Software", | 90000, | ",, | |
| "Peripherals", | 132000, | ",, | |
| "Supplies", | 64000, | ",, | |
| "Magazines", | 295000, | ",, | |
| "Hardware", | 12000, | "Pebble Mill Mall; Raleigh", | . |
| "Software", | 74000, | ",, | |
| "Peripherals", | 108000, | ",, | |
| "Supplies", | 77000, | ",, | |
| "Magazines", | 125000, | ",, | |

. . .

etc.

The returned data size is calculated as follows:

| | | |
|---|---|---|
| (50 rows * 40 Chars) + (9950 rows * 1 char) = | 11950 | STATE |
| ((40 * 50)rows * 100 chars) + (8000 rows * 1 char) = | 208000 | STORE |
| (10,000 rows * 10 chars) = | 100000 | INCOME |
| (10,000 rows * 50 chars) = | 500000 | GOODS |
| | 819950 | |

By comparison with the earlier figure for the situation in which the data is sent in uncompressed form, it is apparent that use of the above technique results in a 60% reduction in transfer size.

These results are entirely dependent on the contents of the data. If, for example, there were 100 types of goods instead of 5, the uncompressed data size would be 40 Million Characters (200,000 rows) and the compressed data size would be 12,599,950 characters. This would be a reduction of nearly 70% and nearly 30 Meg less data to transfer. Equally there may be situations involving random data distribution where only a little improvement would be realised.

To demonstrate the fact that even in situations where the data is unordered, the small set of values relative to the overall number of times used will still gain some benefit, we can use the same set of data as illustrated earlier, but organise it so that the data is effectively completely random.

For the same query issued and ORDERED by INCOME (completely random distribution), then the following situation arises:

GOODS: 1 in 5 rows can be assumed to be a repeat

STATE: 1 in 50 rows can be assumed to be a repeat

STORE: 1 in 2000 rows can be assumed to be a repeat

Hence, the following combinations of full and compressed format data will be achieved in the data sequence:

| FULL | | REDUCED | | | |
|---|---|---|---|---|---|
| (8000 * 50) | + | (2000 * 1) | = | 402000 | GOODS |
| (9800 * 40) | + | (200 * 1) | = | 392200 | STATE |
| (9995 * 100) | + | (5 * 1) | = | 999505 | STORE |
| (10000 * 10) | | | = | 100000 | INCOME |
| | | | = | 1893705 | characters |

This still amounts to a 5% reduction in transfer size. This is a significant saving even though the data is assumed completely evenly and randomly spread. It would be rare for such an even spread and data which is skewed will probably have an improved effect on the compression.

A lot of data will be skewed by nature. Take for example the state field in the earlier example. We have assumed random distribution of this data across the fifty states. However, it is much more likely that the business in question is successful on say the 'west-coast' with half of its business in California alone. With half of the stores in California and a quarter in the next nearest 4 states—the data will be heavily skewed towards them—thereby increasing the hit rate in repetitions substantially over that achieved for the random query.

Based on this data skew, the number of 'hits' in STATE would be calculated as follows:

Half of the stores, and hence half of the records, are in California, and those records have a one-in-two chance of having California as the state for the next record. Hence, 2500 of those records (10000/2/2) will be compressable for the STATE field. One quarter of the records (ie 2500) have a $\frac{1}{16}$th chance of having the same state in the next record (since ¼ will be one of the four states, and ¼ of those will be the same state). Hence 156 of those records (2500/16) will be compressable for the STATE field. Finally, the remaining ¼ of the records will be assumed to be evenly spread across the remaining states, which will have a 1 in 45 chance of repeating. Hence ¼ of the next records will have a state which is one of the remaining states, and there is a 1/45 chance of that state being the same state, which gives a 1/180 chance of having the same state in the next record. Hence, 14 of those records (2500/180) will be compressable for the STATE field.

Adding the above figures up, 2670 records (2500+156+14) will have repeating states, and hence be compressable for the state field. By using this figure in the above calculation performed for a completely random distribution, this would give a transfer size of 1797375 characters (295870 characters for the state rather than 392200 in the random case), or a reduction of 10%. This improvement from 5% to 10% is due entirely to the skew. No account is taken of the fact that this would also skew the STOREs and have further improvement.

When implementing the above described invention, a balance has to be found where the usual trade-off between CPU cycles and memory on the one hand versus transmission sizes on the other is not too severe as to impact overall performance.

Some compression algorithms are very effective as data compressors but are very intensive as CPU operations and need the largest possible data size to get the maximum benefit. These algorithms usually build a dictionary of commonly used sets of characters. To be effective they need a set of data which is large enough to generate a good dictionary.

In the examples given above, rows of 200 characters do not give much room for data compression algorithms of that type to be effective. If you try blocking large numbers of rows to become more effective you have to trade off memory for the blocking, extra cycles, non-busy line time, dynamic dictionary building, etc. These then become too costly to be effective in trying to obtain the necessary low cost throughput.

The preferred embodiment of the present invention achieves excellent compression under certain circumstances by recognising the field structure of the data and looking for simple repetitions, thus allowing it to be used efficiently on a row by row basis.

In a server implementation such as that described earlier, a field by field comparison is performed for any field which may be appropriate. In order to ensure this is kept to a minimum any form of filtering may be employed. Ideally this would be implemented efficiently with other relevant tasks such as type-validation.

A simple example may be to only check character fields with a length between, say, 10 and 1000 characters. This assumes there is a certain minimum value not worth the reduction and a certain maximum value over which it is unlikely to be a structured field containing repetitious data. A more complex alternative might be based on the statistics of the database to determine fields which have a relatively low number of distinct values to occurrences for single table queries. In fact, these statistics may already be used by the database query optimiser typically provided to determine the best access path to retrieve the data, allowing a database query to have estimated the best candidates for repeating fields.

As client CPU cycles are generally very important, the compression method should be very efficient. The algorithm used in the preferred embodiment can actually REDUCE the resource required at the client side. If we assume a copy from some form of communications structure to a structure usable by the client application:

| Form comms pipe | | Structure to be handed to client app. |
| --- | --- | --- |
| Comms_Structure.STORE | ----> | sqlca.STORE |
| Comms_Structure.STATE | ----> | sqlca.STATE |
| Comms_Structure.INCOME | ----> | sqlca.INCOME |
| Comms_Structure.GOODS | ----> | sqlca.GOODS |

A simple check may avoid the client from having to do any field work:

```
if Comms_Structure.STORE[1] = '.'
    Do_Nothing /* CLIENT DATA STRUCTURE ALREADY CONTAINS CORRECT, */
              /* VALIDATED VALUE                                  */
else
    Do_Whatever_Copy/Validation/Type-checking/Type-Conversion_you_like
```

When data is passed between different systems, there is often a requirement for the system to translate characters between different code pages (for example, from ASCII to EBCDIC). As will be appreciated by those skilled in the art, this translation capability is needed because different computers represent the same characters in different ways. This helps to support different computer architectures, and different national languages. The technique of the preferred embodiment enables a reduction in the amount of data to be transferred, without interfering with other processes such as the translation from ASCII to EBCDIC which have to be done regardless of whether the data is reduced or not, and further provides this reduction in a manner which is more efficient in terms of CPU usage, etc at both the transmitter and receiver end.

Most replication solutions use change record formats and protocols which are specific to the databases that they support. The preferred embodiment provides a solution which can be employed in heterogenous environments with mixed—operating systems, —databases—networks, in addition to being applicable to specific environments.

From the above description, it can be seen that the preferred embodiment of the present invention provides a technique for efficiently compressing structured data, that is data that is normally represented as a sequence of data records broken into separate fields, and having means to enable the various fields to be identified, such as by being delimited.

In the preferred embodiment, the technique described enables the amount of data to be reduced in a way that is independent of factors such as the machine/database type, character sets, network protocol, etc. The technique can be integrated with the database system and the query optimiser to produce an efficient means of data compression which is based on information about the structure of the data, this being available to the database system.

By taking the structure of the data into account, and by realising the recurrent nature of certain data, the technique can be viewed as actually removing data from the data sequence, as opposed to compressing the data that is there. The resulting smaller data sequence could then still be subjected to other data compression techniques, for example the compression technique described in U.S. Pat. No. 4,701, 745, to thereby yield further improvements.

Hence, in summary, the technique of the preferred embodiment is a very quick algorithm, taking very little resource. It does not prevent the use of more traditional compression techniques, and it is extremely simple. Further, it recognises the field structure of the data and uses this as a method to achieve potentially excellent compression. Its algorithm is not affected by the host computer architecture nor that of the transport layers. Additionally, it can reduce the CPU resources required at the client side, thereby improving performance above and beyond the data reductions.

I claim:

1. A method of compressing a data sequence comprising a plurality of records, each record having a plurality of fields and each field being arranged to contain a data item, the method comprising the steps of:

(a) for a current field within a current record other than the first record in the data sequence:
  (i) comparing (250) the data item in the current field with the data item in the corresponding field of a preceding record;
  (ii) if the data item matches the data item in the corresponding field, replacing (270) the current field, data item by a token indicating the match; and
 (b) repeating step (a) for a predetermined number of fields in a plurality of records of the data sequence.

2. A method as claimed in claim 1, wherein said step (a) is repeated for said predetermined number of fields in every record of the data sequence.

3. A method as claimed in claim 1, wherein the predetermined number of fields is every field in the current record.

4. A method as claimed in claim 1, wherein, at step (a)(i), the data item in the current field is compared with the data item in the corresponding field of the immediately preceding record, and the method further comprises, subsequent to performing the comparison step (a) for the predetermined number of fields in the current record, the step (290) of storing the uncompressed current record as the immediately preceding record for use in the performance of said step (a)(i) on the predetermined number of fields of a subsequent record.

5. A method as claimed in claim 1, wherein steps (a) and (b) are performed by a processor of a server computer (30), the method comprising the further step of sending the data records of the data sequence as compressed by steps (a) and (b) over a network to a client computer (10).

6. A method of decompressing a data sequence compressed according to the method as claimed in claim 1, comprising the steps of:

(A) for each field within a current record other than the first record in the data sequence:
  determining whether the field contains the token;
  if the field does contain the token, replacing the token by the data item in the corresponding field of a preceding record; and (B) repeating step (A) for a plurality of records of the data sequence.

7. A system for compressing a data sequence comprising a plurality of records, each record having a plurality of fields and each field being arranged to contain a data item, the system comprising:

comparison means (60) which, for a current field within a current record other than the first record in the data sequence, is arranged to compare the data item in the current field with the data item in the corresponding field of a preceding record; and match indication means (70), responsive to a signal from the comparison means (60) indicating that the data item matches the data item in the corresponding field, for replacing the current field data item by a token indicating the match;

the comparison means (60) being arranged to repetitively perform the comparison process on a predetermined number of fields in a plurality of records of the data sequence.

8. A system as claimed in claim 7, wherein the comparison means (60) is arranged to perform the comparison process on the predetermined number of fields in every record of the data sequence.

9. A system as claimed in claim 7, wherein the predetermined number of fields is every field in the current record.

10. A system as claimed in claim 7, wherein the comparison means (60) is arranged to compare the data item in the current field with the data item in the corresponding field of the immediately preceding record, and the system further comprises storing means operable, subsequent to the comparison means having performed the comparison for the predetermined number of fields in the current record, to store (290) the uncompressed current record as the immediately preceding record for use by the comparison means (60) when performing the comparison step on the predetermined number of fields of a subsequent record.

11. A system as claimed in claim 7, wherein the system is incorporated within a server computer (30), the server being arranged to output the data records of the data sequence as compressed by the system for transfer over a network to a client computer (10).

* * * * *